Figures 6, 7:
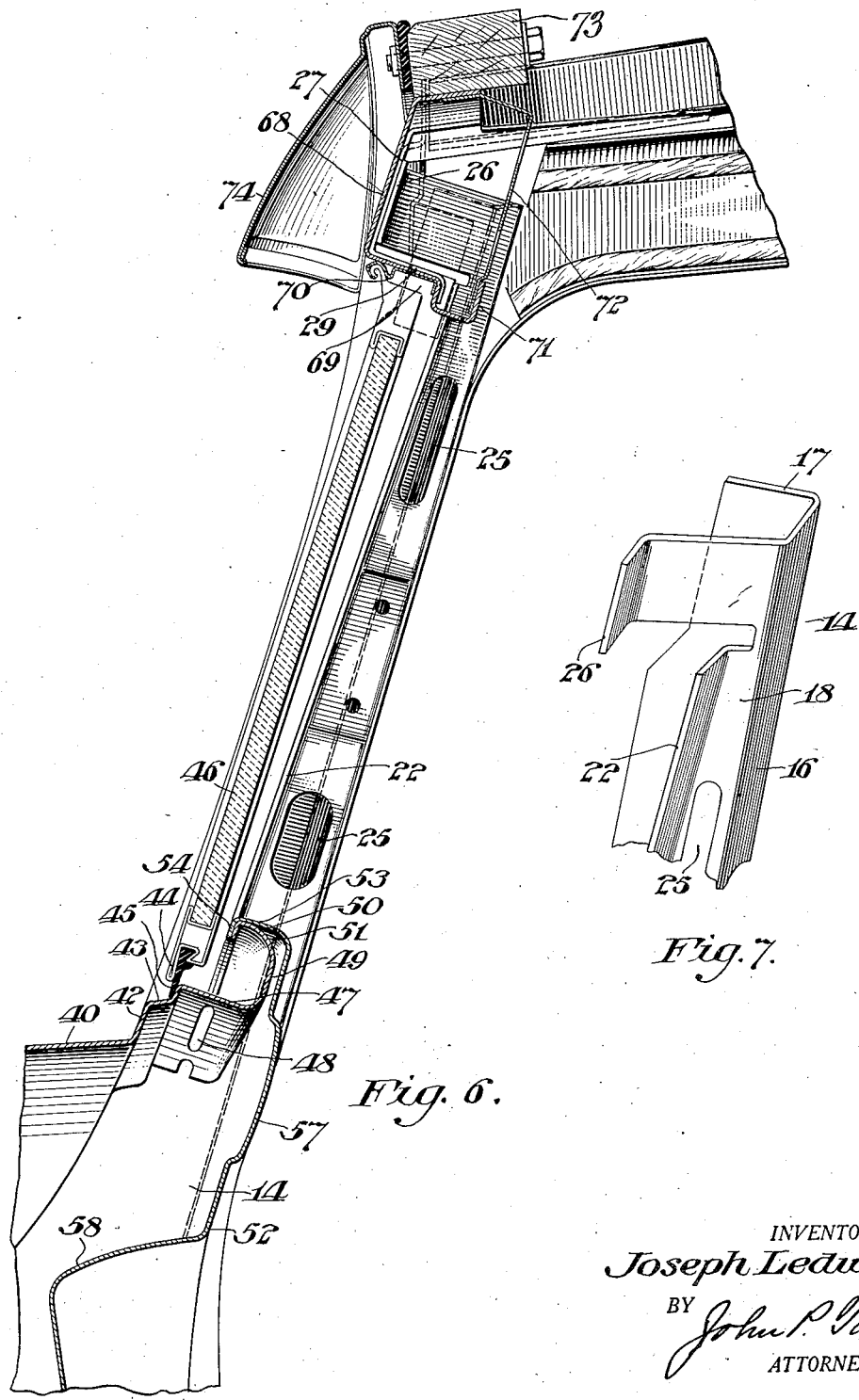

April 14, 1936. J. LEDWINKA 2,037,664
VEHICLE CONSTRUCTION
Filed July 2, 1932 3 Sheets-Sheet 1
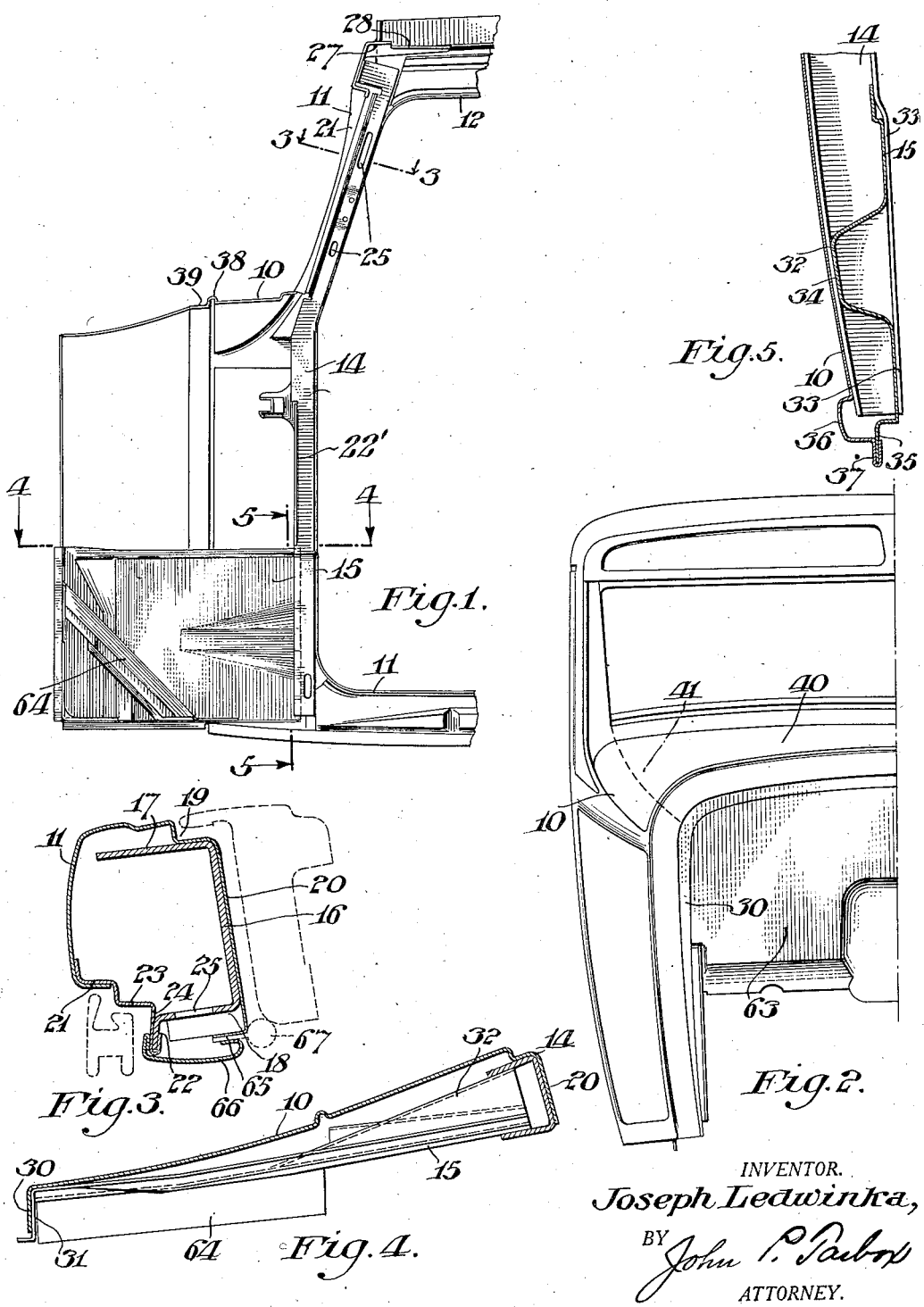
INVENTOR.
Joseph Ledwinka,
BY John P. Barbor
ATTORNEY.

April 14, 1936. J. LEDWINKA 2,037,664
VEHICLE CONSTRUCTION
Filed July 2, 1932 3 Sheets-Sheet 2

INVENTOR.
Joseph Ledwinka,
BY John P. Tarbox
ATTORNEY.

April 14, 1936.  J. LEDWINKA  2,037,664
VEHICLE CONSTRUCTION
Filed July 2, 1932    3 Sheets-Sheet 3

INVENTOR.
Joseph Ledwinka,
BY
John P. Tarbox
ATTORNEY.

Patented Apr. 14, 1936

2,037,664

UNITED STATES PATENT OFFICE 2,037,664

VEHICLE CONSTRUCTION

Joseph Ledwinka, Philadelphia, Pa., assignor to Edward G. Budd Manufacturing Company, Philadelphia, Pa., a corporation of Pennsylvania Application July 2, 1932, Serial No. 620,585

11 Claims. (Cl. 296—28)

My invention relates to vehicle body constructions and more particularly to a vehicle body front construction fabricated out of sheet metal stampings.

It is a main object of the invention to provide a construction of this kind in which the structure is built up of relatively few stampings of simplified form, in which the various stampings entering into the construction have edge conformations adapting them for easy joinder to adjacent stampings by spot welding and in which the various stampings are made to serve wherever possible several different functions, whereby the construction and assembly of the parts is generally greatly simplified and a structure is provided which is strong, rigid and durable and yet of very light weight.

I attain the objects of the invention in large part by forming the paneling of the cowl in three main stampings forming respectively the sides and top portions of the cowl. The side portions of the cowl stampings are extended up along the sides of the windshield openings to form covers for the A-post structures and are so joined in said structures as to form hollow box section post structures provided with rabbets to receive the edge of the door and the windshield and covering the A-post stampings proper at front, side and back. The A-posts proper are simple forwardly facing channel section members suitably flanged along their inner side walls for easy joinder to adjacent units. According to the invention the A-posts are strongly reinforced in their lower regions and interbraced at the forward edge of the cowl paneling through a unitary stamping extending into the A-posts at their rear portions and laterally offset for joinder to both side walls of the posts.

According to a further feature of the invention the instrument board panel may be a simple one-piece stamping serving as a deflector for the car ventilator and having edge conformations which facilitate its joinder to the adjacent units and interbrace the post structures and the rear edge of the top of the cowl. The rear edge of the upper cowl stamping is formed to provide a seat for the lower edge of the windshield and bent to form with the edge of the instrument board panel stamping, to which it is joined, a deflector for deflecting the air downwardly through ventilating openings formed in the cowl panel rearwardly of the windshield plane.

Another feature of the invention consists in forming the A-post stamping at the top with a forwardly offset portion adapted to support a transverse header member connecting the tops of the A-posts in a plane forwardly of the plane of the windshield.

The construction of the invention lends itself very readily to the formation of an automobile front having an inclined windshield, and I have shown it embodied in such a construction in the drawings, but it will be understood that most of the novel features are adaptable to other types of construction.

Figure 8:
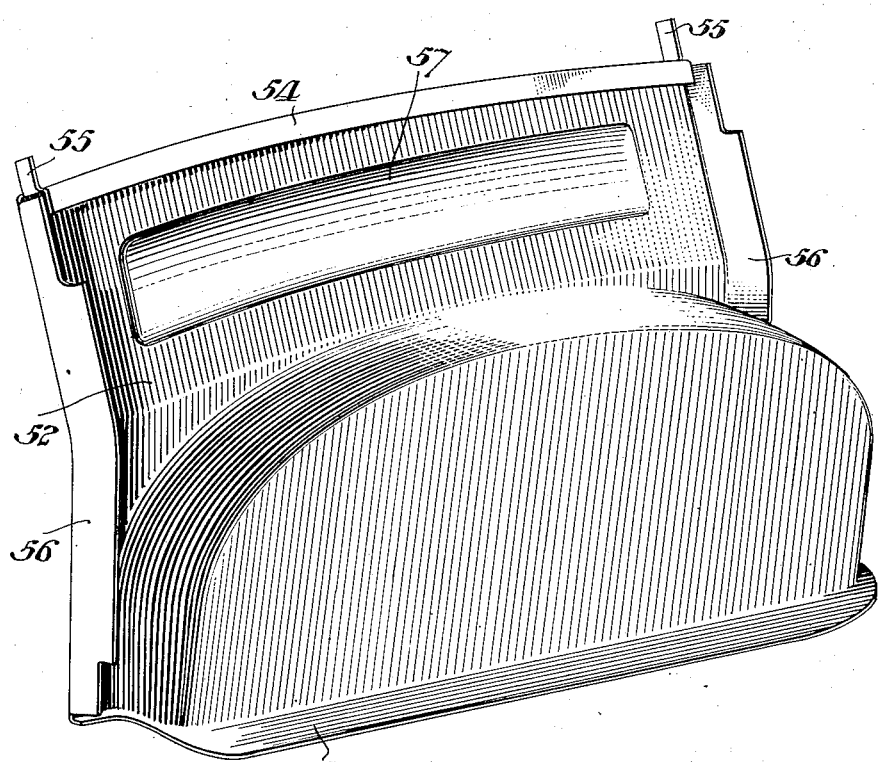
Figure 9:
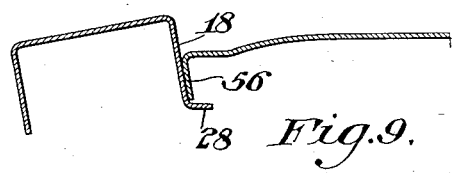
Figure 11:
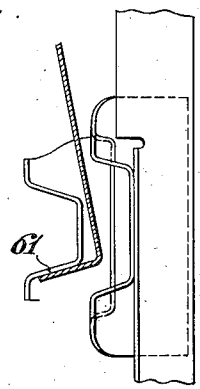
Figure 10:
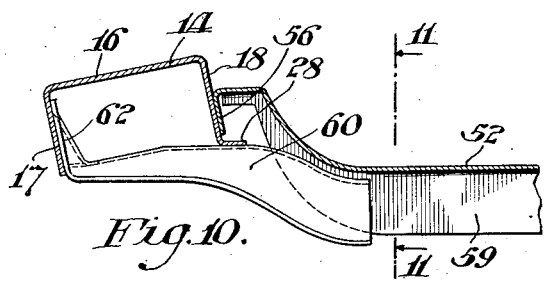

Other and further objects and advantages and the means by which they are attained clearly become apparent from the following detailed description when read in the light of the accompanying drawings, in which Figure 1 is a view in inside elevation of the forward portion of a side unit constructed in accordance with the invention, Fig. 2 is a partial front elevational view of the body construction according to the invention, Figs. 3, 4 and 5 are detail sectional views, the sections being taken respectively along the correspondingly numbered section lines shown in Fig. 1, Fig. 3 showing in dotted lines the position of the adjacent edges of the door and windshield frames in their relation to the post structure, Fig. 6 is an enlarged central vertical longitudinal sectional view through the windshield frame portion of the body, Fig. 7 is a detail perspective view of the inside portion of the upper end of the front post, Fig. 8 is a perspective view of the unitary instrument board panel stamping, Figs. 9 and 10 are, respectively, detail transverse sectional views through the joint between the post stamping and the instrument board panel taken respectively adjacent the upper and lower portions of the instrument board panel, and Fig. 11 is a detail sectional view of the joint shown in Fig. 10 taken substantially on the line 11—11 of Fig. 10.

The body according to the invention is preferably built up for ease of assembly at the front into three separate units, two side and a front unit.

As illustrated in Fig. 1 the side unit may comprise a cowl panel 10 formed as a unitary stamping with a vertically extending front post section 11 which may be extended rearwardly by a portion 12 forming the outside of the body above the door opening and the side portion of the roof. Similarly at the bottom the paneling 10 may be extended rearwardly at 11 to form the threshold of the door opening. This outer paneling is reinforced by a front post stamping 14 and a deep vertical inner cowl brace stamping 15.

The A-post 14 comprises a simple forwardly presenting channel section stamping having a bottom wall 16, an outer side wall 17 and an inner side wall 18, and extending from the bottom of the body to the roof. This post stamping in the region of the windshield opening is entirely covered on its front, outer and rear side by portion 11 of the outer panel stamping. This panel stamping is formed with an offset 19 along its rear edge adapted to receive the edge flange of the door and through the bottom wall of this offset 19 it is secured as by spot welding to the outer side wall 17 of the post. The rear edge of the panel stamping is flanged inwardly at 20 to overlap the bottom wall 16 of the post and is likewise secured thereto by spot welding. The front wall of the portion 11 of the panel is formed with a rearwardly extending flange 21 forming the outer side wall of the windshield edge receiving rabbet, the rear side wall of which is defined by an inwardly extending flange 22 on the inner side wall 18 of the post stamping, the flanges 21 and 22 being bridged by a separate angular stamping 23 spot welded to the flange 21 of the outer panel and formed with a flange 24 overlapping flange 22 and crimped over its edge and further secured thereto by spot welding.

This combination of panel and post stamping provides a very simple post construction in the region of the windshield opening and one which is readily joined together in the final assembly by spot welding. Access is had to the interior of the post for certain of the spot welding operations through openings 25 which are provided at spaced points in the inner flange 18 of the post stamping. At the top the inner side wall 18 of the post stamping is extended forwardly of the flange 22 defining the rear wall of the windshield edge receiving rabbet and formed with an inwardly extending flange 26 to which is secured a rearwardly facing channel bracket 27 having a rearward extension 28 for securement to the side header and having its bottom side wall 29 defining the top wall of the windshield receiving recess.

Below the windshield opening the flange 22 extending from the inner wall 18 of the post stamping is omitted for some distance and then the post is again provided with a short inwardly extending flange 22' in the region approximately midway of the vertical side of the cowl for a purpose which will become apparent later on.

The forward edge of the cowl stamping is flanged inwardly at 30 and the vertically extending brace stamping 15 is correspondingly inwardly flanged at 31 and secured strongly by spot welding to the forward edge of the cowl. The rear portion of this vertically extending stamping 15 is extended into the forwardly presenting channel post 14 and is provided with a laterally offset portion 32 forming with the upper and lower portions of the stamping a corrugated section as clearly appears in Fig. 5 overlapping the opposite side walls of the post at 33 and 34 and interconnected by spot welding to the side walls of the post and thus strongly interbracing the side walls of the post forming in effect a hollow box section in the lower region of the post. The lower portion of the stamping 15 is formed with a downwardly extending flange 35 and the paneling 10 is formed with a bead 36 along its lower edge, the lower side wall of this bead having a downwardly extending flange 37 which is crimped over the edge flange 35 of the stamping 15 and spot welded thereto.

The cowl stamping 10 is formed with a bead 38 intermediate its front and rear edges, this bead defining a seat 39 for receiving the rear edge of the hood, the greater portion of the cowl being adapted to extend under the hood.

The side units of the cowl are joined by a central top cowl stamping 40 which is flash welded to the side panels 10 along lines indicated in Fig. 2 by the dotted line 41, this flash weld being later smoothed off to provide a continuous smooth cowl panel extending from the bottom of one side of the cowl to the opposite side of the cowl. This top panel stamping 40 is formed with a bead corresponding to the bead 38 and a seat corresponding to the seat 39 of the side panel and at its front edge with a flange corresponding to the flange 30 of the side panel, thus forming a continuous seat for the rear edge of the hood and a continuous flange construction at the forward edge of the cowl.

At the rear the top cowl panel stamping 40 is flanged upwardly at 42, rearwardly at 43 and then upwardly at 44, portions 43 and 44 forming an angular seat to receive and seat the weather strip 45 of the lower edge of the windshield 46. The portion 46 is continued rearwardly by a relatively wide flange 47, which flange is provided with a number of spaced openings 48 providing ventilating openings extending under the cowl. The flanged portion 47 having the ventilating openings is extended upwardly at 49 and forwardly at 50 and finally terminates in a downwardly extending flange 51, the flange 51 being located substantially in the plane of the rear wall of the windshield receiving rabbet and hence in the plane of the wall of the flange 22 of the post.

By this construction a very simple structure is provided for effecting the cowl ventilation. The windshield 46 which is shown as being of the outwardly swinging type will, when swung outwardly permit the air to rush in under it and be whirled around by the upwardly, forwardly and downwardly extending portions 49, 50 and 51 of the cowl panel and directed downwardly through the ventilating openings 48 in the rearwardly extending portion 47 of the cowl panel.

The rear edge of the cowl panel so formed cooperates very effectively to provide a means of joinder for the unitary instrument board panel stamping 52 which forms not only an instrument board panel but also an inner garnish for the lower portion of the windshield opening, and as a deflector for the air passing through the ventilating openings 28, deflecting it forwardly and downwardly into the cowl. Additionally this unitary stamping 52 provides a very strong lateral bracing between the posts of the side units. The construction of this unit together with the manner of its joinder to the parts associated therewith will now be described in detail.

At the top the stamping 52, as clearly appears in Figs. 6 and 8, is formed with a downwardly presenting channel portion 53 providing a forward flange 54 which is adapted to overlap and be secured by spot welding to the flange 51 at the edge of the cowl panel. The bottom wall of this top channel is formed with upwardly extending tabs 55 overlapping the inside wall 18 of the post and secured thereto as by spot welding. At the sides the stamping 52 is provided from top to bottom with forwardly extending flanges 56 which flanges overlap the side wall 18 of the post and are secured thereto by spot welding. In its transversely extending portion the panel 52 is formed at its upper region with an embossed portion 57 and in its lower portion with a forwardly extended offset portion 58 and at the lower edge with a forwardly extending edge flange 59. These various flanges and embossings provide a stamping of irregular form giving it great strength although formed of light gauge metal and providing a strong reinforce between the side walls of the opposed posts. At the bottom this flange 59 of the stamping 52 is further strongly connected to the post 14 through a flanged channel bracket 60 having one of its side walls 61 overlapping the flange 59 and secured thereto by spot welding, having its bottom wall overlapping the flange 28 on the post and spot welded thereto and its outer end flanged forwardly and flattened out at 62 and secured by spot welding to the outer side wall 17 of the post as clearly appears in Fig. 10. The bracket 60 therefore not only interconnects the lower portion of the stamping 52 to the post but strongly interbraces the side walls of the post in this region and thus provides the box section construction of the post in the region between the upper box section portion and the lower box section portion.

The front of the cowl is reinforced by the usual transverse shroud panel 63 spot welded to the inwardly extending flange 30 of the forward edge of the cowl. The usually inclined toe board support 64 is secured to the side units and not necessarily described herein in detail.

In the region of the windshield opening the inwardly extending jamb face portion of the panel 10, 11 is formed as indicated in Fig. 3 with an edge flange 65, this flange forming a seat for the attachment of an outwardly facing channel trim strip 66, between the rear edge of which and the flange 65 may be secured the usual wind-break 67.

Above the windshield opening the side units are interconnected by a rearwardly facing channel section header stamping 68 which overlaps the similarly sectioned brackets 27 projecting inwardly from the side units and is rigidly secured thereto by spot welding. The lower side wall of this header is formed with a rabbet 69 to receive and seat the windshield hinge mounting 70, and its rear edge is upwardly flanged at 71. The header is internally reinforced by a stamping 72 overlapping its edges and forming therewith a box section structure, strongly interconnecting the tops of the front posts. A wooden cross bar 73 overlies the header and is secured thereto and serves to secure the upper edge of the visor 74 and support the front of the roof structure, not shown.

While I have in the foregoing detailed description set forth a construction which I have found highly efficient in practice, it will be understood that various changes and modifications may be made by those skilled in the art without departing from the spirit of the invention and all such changes and modifications I desire to include within the spirit and scope of the appended claims.

What I claim is:

1. In a vehicle body construction, a front post having a main body stamping of forwardly presenting channel section having an inwardly extending flange from its inner side wall and a cover panel for said post covering the outer side and front of said post and forming therewith a box section post structure, said panel being joined to said flange along one of its edges and formed with a rabbet to receive the edge of the windshield, the other of said panel edges overlapping the bottom wall of the post, secured thereto and forming the door jamb face.

2. In a vehicle body construction, a cowl top panel formed at its rear edge with an angular seat to receive the edge of a movable windshield panel and an upwardly forwardly and downwardly bent edge terminating in the plane of the windshield and having ventilating perforations formed therein in rear of said windshield seat.

3. In a vehicle body construction, a front post of forwardly presenting channel section having its inner side wall formed at the top with inwardly extending flanges arranged in offset relation to each other, a transversely extending top header secured to one of said flanges and the other of said flanges defining a windshield stop.

4. In a vehicle body construction, a front post of forwardly presenting channel section, a cowl panel applied to said post and extending forwardly thereof, and a cowl bracing stamping having its rear end extended within the hollow of the post and offset to overlap both sides of the channel of the post, and its forward end secured to the forward edge of the cowl.

5. A vehicle body construction including front posts of channel section presenting longitudinally of the body, an instrument board panel having lateral flanges extending from substantially the top to the bottom of said panel and overlapping and secured to the inner side walls of said posts, and an upper edge of downwardly presenting channel form, forming the interior finish at the bottom of the windshield opening.

6. A vehicle body construction including front posts, cowl paneling extending between said posts and having its upper edge formed with a windshield seat and in rear of said seat extended rearwardly and upwardly and terminating in a downwardly directed flange, an instrument board panel joining said posts and having its upper edge flanged forwardly and then downwardly, the downwardly extending flange being secured to the downwardly extending edge flange of the cowl paneling.

7. In a vehicle body construction, a front construction including a forwardly facing channel post, paneling combined with said post in the region at the side of the windshield opening to form a box section structure, the post being formed with an inwardly extending flange defining the rear wall of a windshield seat, the paneling being formed with a rabbet to receive the edge of said windshield and secured to said flange along one margin, the opposite margin of the paneling overlapping the bottom wall of the post, secured thereto and forming the door jamb face.

8. In a vehicle body construction, cowl panel, a forwardly presenting channel section post at the rear edge of said cowl panel, a vertically widened reinforcing stamping for said cowl panel and post said stamping being secured at its forward end to the cowl panel, and having its rear end telescoped within the post, and having laterally offset portions lying against and secured to the opposite sides of the post.

9. In a vehicle body construction, a cowl panel stamping having a seat in the windshield plane to receive the edge of a windshield and extended rearwardly of the windshield and then upwardly, said rearwardly extended portion being formed with ventilating openings, and an instrument panel secured along its upper edge to said upwardly extended portion of the panel and forming therewith a deflector to deflect air through said openings.

10. In a vehicle body construction, a cowl panel, a forwardly presenting channel section front post, a vertically widened stamping interbracing the side walls of the post and extended forwardly to additionally interbrace the forward portion of the cowl panel with said post.

11. A cowl panel preformed to include the pillar finish elements at the windshield openings and extending downwardly and inwardly to form jamb faces of the door, and pillar members secured along the length of the pillar to the inner surface of the door jamb.

JOSEPH LEDWINKA.